United States Patent [19]
Shibata

[11] Patent Number: 5,678,054
[45] Date of Patent: Oct. 14, 1997

[54] DATA SEARCHING DEVICE

[75] Inventor: Satoshi Shibata, Aichi-ken, Japan

[73] Assignee: Brother Kogyo Kabushiki Kaisha, Aichi-Ken, Japan

[21] Appl. No.: 318,189

[22] Filed: Oct. 5, 1994

[30] Foreign Application Priority Data

Oct. 20, 1993 [JP] Japan .................................. 5-262113

[51] Int. Cl.$^6$ .................................................. G06F 17/22
[52] U.S. Cl. .................................................. 395/794
[58] Field of Search .................................. 395/794, 793, 395/795; 364/419.13, 419.11, 419.14

[56] References Cited

U.S. PATENT DOCUMENTS

5,583,762  12/1996  Shafer .................................. 395/794

Primary Examiner—Phu K. Nguyen
Attorney, Agent, or Firm—Kane, Dalsimer, Sullivan, Kurucz, Levy, Eisele and Richard, LLP

[57] ABSTRACT

A data searching device has a data inputting keyboard, a primary data memory, a secondary data memory and a display. A controller compares data input by the data inputting keyboard with primary data stored in the primary data memory. If the primary data matches the input data, the controller outputs the secondary data related to the primary data to the display. The display has a plurality of display areas, with a first display area displaying a portion of each of the secondary data related to the primary data. A secondary data selector selects one of the secondary data displayed in the first display area, and displays all of the data associated with the selected secondary data in a second display area.

18 Claims, 11 Drawing Sheets

| a▨ | pPT | aardvark▨ | pPT | aardwolf▨ | pPT |
| aba▨ | pPT | abaca▨ | pPT | abaci▨ | pPT | aba |
| ck▨ | pPT | abaculus▨ | pPT | abacus▨ | pPT |
| abaft▨ | pPT | abalienate▨ | pPT | abalone |
| ▨ | pPT | abandon▨ | pPT | ... |
| ... | zymosis▨ | pPT | zymot |
| ic▨ | pPT | zymurgy▨ | pPT | zythum▨ | pPT | ▨ |

| ... | ▨ | 1 | dPT | tPT | 3 | dPT | tPT | ▨ | 0 | d |
| PT | tPT | 2 | dPT | tPT | ▨ | 1 | dPT | tPT | 3 | dPT |
| tPT | 3 | dPT | tPT | ▨ | 1 | dPT | tPT | ▨ | 1 | dPT | t |
| PT | 1 | dPT | tPT | 1 | dPT | tPT | ▨ | ... |

WORD: book■

DEFINITION:

NOUN: A printed and boun
VERB: To claim in advanc
VERB: To register in or

SYNONYM:
engage
reserre
bespeak
pre-empt

VERB: To claim in advance.

5,678,054

1

DATA SEARCHING DEVICE

BACKGROUND OF THE INVENTION

The present invention relates a device having a data searching function such as an electronic dictionary.

In a data searching device such as an electronic dictionary a word is input by a user, then a data searching operation is performed, to find, for example, the meaning of the word.

Generally, in electronic dictionaries, including language translation dictionaries, the searched data includes word definitions, synonyms, grammatical part-of-speech, etc. The data is stored in a semiconductor ROM (Read Only Memory), CD-ROM or another storage medium. The data is organized such that each primary data has related secondary data, the secondary data representing a part-of-speech, definitions, synonyms etc. Generally, there is a plurality of secondary data for each primary data.

When the user inputs a word, a primary data search is carried out to find the identical primary data stored in the ROM. Then, the secondary data related to the input data is displayed on a display, such as a CRT (Cathode Ray Tube).

However since the CRT has a limited display area, if the primary data has many secondary data, it is impossible, in the conventional system, to display all the secondary data on the screen at the same time. In some data search devices, the user cannot refer to the data which is not currently displayed. In other data search devices, in order to see data which is not presently displayed on the screen, the displayed image must be scrolled by using a key operation.

In the former type of devices, since the user cannot refer to all the data, i.e., part-of-speech, definitions etc., the user may have difficulty in understanding the meaning of the searched word.

Further in the latter type of devices, since all the data is not displayed at the same time but must be scrolled, the user may have difficulty understanding the meaning of the searched word.

SUMMARY OF THE INVENTION

It is therefore an object of the invention to provide an improved data searching device which enables a user to refer to any information corresponding to a selected data even on a screen having a limited area.

For the above object, according to the invention, there is provided a data searching device comprising:

input means for inputting data;

a memory for storing primary data and a plurality of secondary data related to the primary data;

a display for displaying data;

a selector for selecting data displayed on the display; and a controller for comparing the input data with the primary data, the controller outputting the secondary data to the display, wherein the display has a plurality of display areas, wherein a first display area displays a portion of each of the secondary data related to the primary data, the selector selecting one of the secondary data displayed in the first display area, wherein a second display area displays all of one of the secondary data selected by the selector.

According to another aspect of the present invention, there is provided a data searching device comprising:

a data inputting keyboard;

2 a primary data memory;

a secondary data memory;

a display;

a secondary data selector; and a controller, wherein the controller compares data input by the data inputting keyboard with primary data stored in the primary data memory, wherein the controller outputs to the display, the secondary data related to the primary data and stored in the secondary memory, if the primary data matches the input data, and wherein the display has a plurality of display areas, wherein a first display area displays a portion of each of the secondary data related to the primary data, the selector selecting one of the secondary data displayed in the first display area, wherein a second display area displays all of one of the secondary data selected by the selector.

According to a further aspect of the present invention, there is provided a method of displaying data on a screen of a data searching device, the method comprising the steps of:

inputting data;

storing primary data and a plurality of secondary data related to the primary data;

comparing the input data with the primary data;

displaying a portion of all of the secondary data in a first display area of the screen;

selecting one of the secondary data displayed in the first display area; and displaying all of the selected secondary data in a second display area of the screen.

DESCRIPTION OF THE EMBODIMENTS

Figure 1:
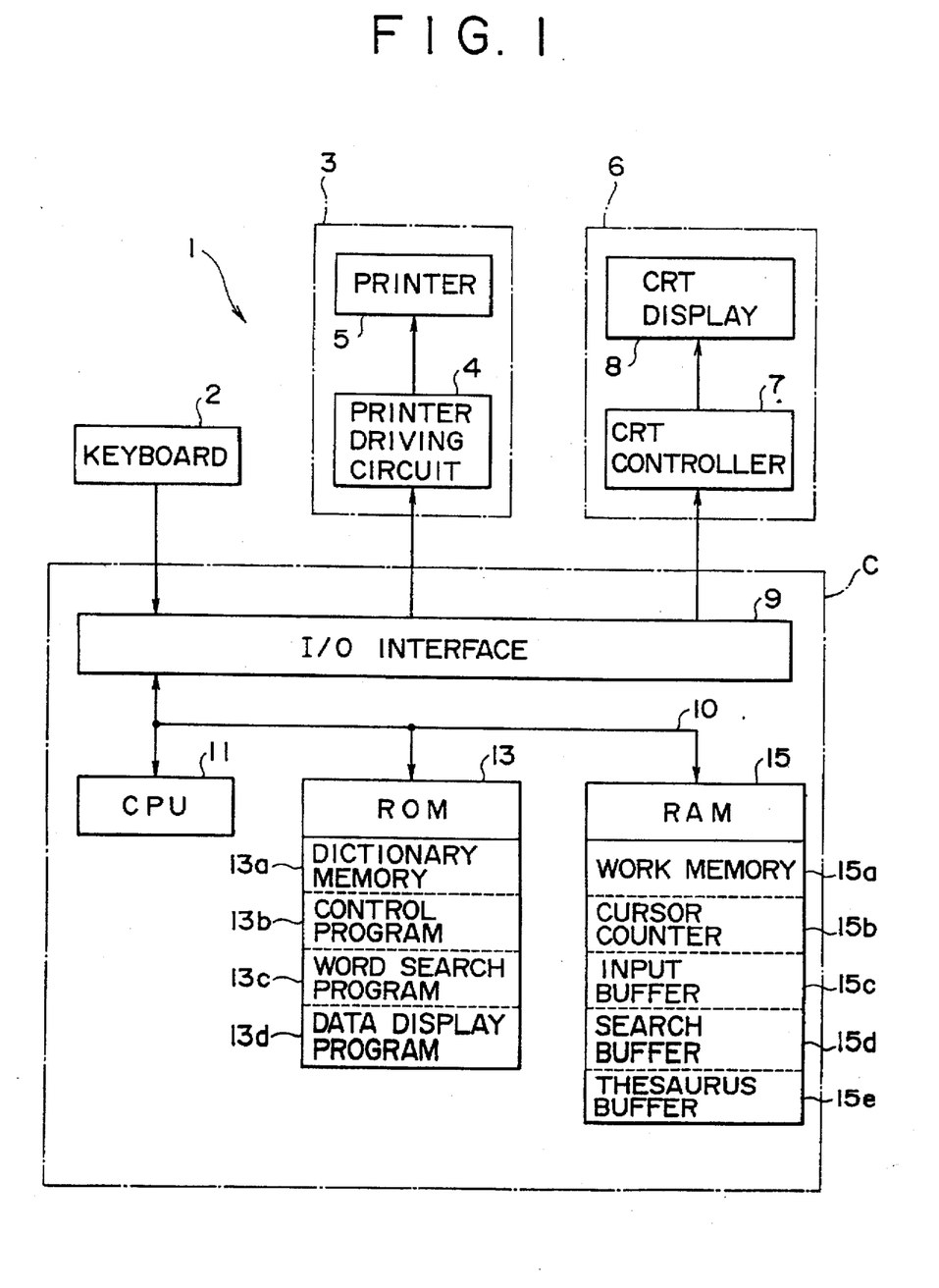
FIG. 1 is a block diagram illustrating a control system of an electronic data searching device embodying the present invention.

FIG. 1 is a block diagram illustrating a control system of an electronic data search device 1 embodying the present invention. The electronic data search device 1 has a keyboard 2, a printing unit 3, a displaying unit 6, and a control unit C for controlling the entire system.

The keyboard 2 is provided with alphanumeric keys for inputting word data, cursor keys for moving a block cursor on a CRT display 8, a start key for initiating a word search operation, and various other function keys such as a Return key, space key, etc.

The printing unit 3 has a printer drive circuit 4 and a printer 5 for printing data on a recording sheet. The display unit 6 has a CRT controller 7 and a CRT display 8 which is capable of displaying a plurality of lines of character data, e.g., the search result.

The keyboard 2, the printer drive circuit 4, and the CRT controller 7 are connected to the controller C through an I/O interface 9.

The I/O interface 9 is connected to a CPU 11 of the controller C through an internal bus 10. A ROM 13 and a RAM 15 are also connected to CPU 11 through bus 10. The bus 10 includes address lines and data lines.

The ROM 13 has a dictionary memory 13a. The ROM 13 also stores various programs such as a control program 13b, word search program 13c, and a data display program 13d, etc.

The dictionary memory 13a stores word data 31 as primary data, and stores part-of-speech data 41, definition data 51, and thesaurus data 61 as secondary data.

The word search program 13c is a program which executes an operation for searching for a word inputted by an operator, to find the parts-of-speech and corresponding definitions for each part-of-speech. The data display program 13d is a program which executes an operation for displaying the searched word, and its related parts-of-speech, definitions, and synonyms, on the CRT display 8. The control program 13b is a program for controlling other operations of the electronic data search device 1.

The RAM 15 includes a work memory 15a, a cursor counter 15b, an input buffer 15c, a search buffer 15d, and a thesaurus buffer 15e.

The work memory 15a is used for temporarily storing data required for data search and data display operations, and is also used for performing calculations. The cursor counter 15b stores the line number where the block cursor 95 is displayed on the CRT display 8. The input buffer 15c stores the string of data, inputted by the user, which represents the word to be searched. The search buffer 15d stores a part-of-speech and definition of the searched word. The synonym buffer 15e stores the synonyms of the searched word.

Figure 2:
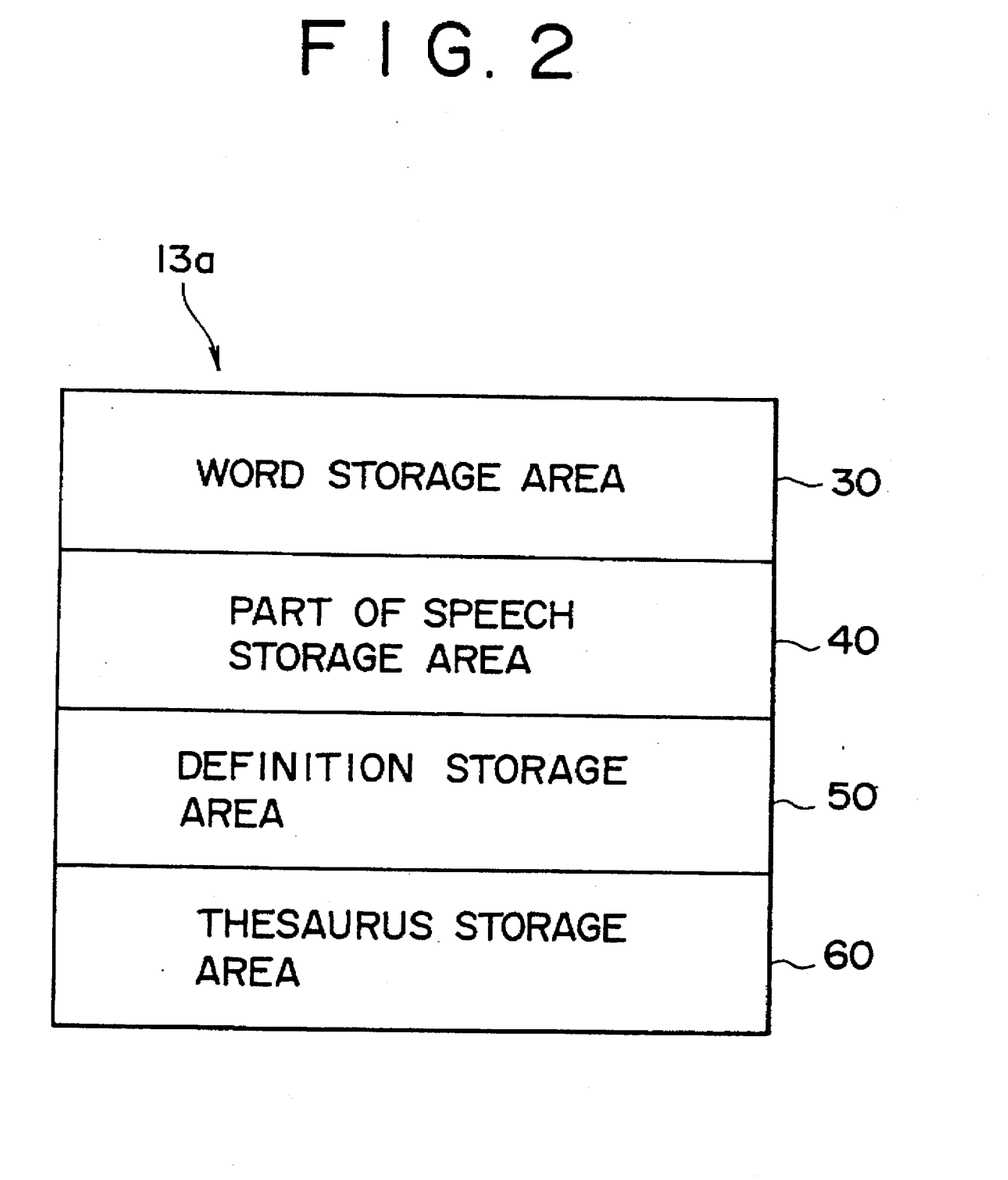
FIG. 2 shows a schematic map of a dictionary memory of the electronic storage device shown in FIG. 1.

FIG. 2 shows a schematic map of the dictionary memory 13a. The dictionary memory 13a includes a word storage area 30, a part-of-speech storage area 40, a definition storage area 50 and a thesaurus storage area 60.

Figure 3:
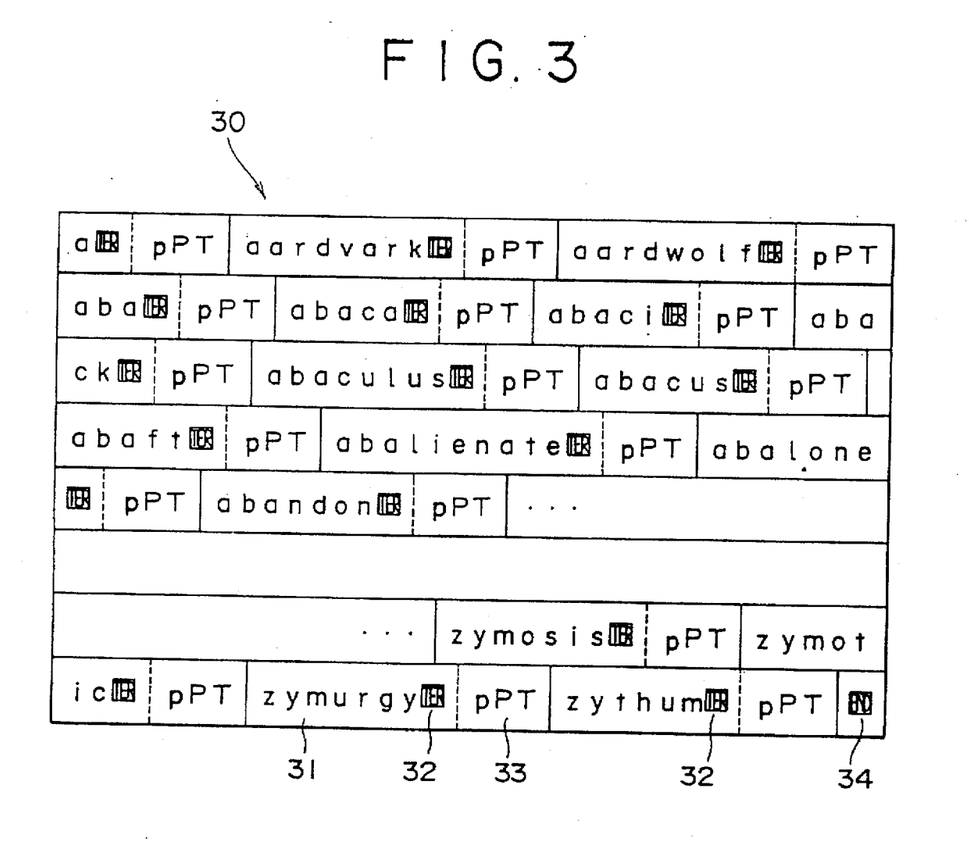
FIG. 3 shows a map of a word storage area of the dictionary memory shown in FIG. 2.

FIG. 3 shows a map of the word storage area 30 of the dictionary memory 13a. The word storage area 30 includes word data 31, a terminator code 32, a part-of-speech pointer (pPT) 33, and an end code 34.

The word data 31 is a list of words used to search for the input word. The word data 31 is stored in alphabetical order from a to z. Since adjacent words may have a different numbers of letters, the words are separated by the terminator code 32.

The terminator code 32 indicates the separation of each word, and also indicates the separation between the above described storage areas 30, 40 and 50. The terminator code 32 is also used for separating the data stored in the buffers 15d and 15e. In the present invention, the terminator code 32 is one byte long.

The part-of-speech pointer (pPT) 33 is two bytes long and is stored immediately after the terminator code 32 of the corresponding word data. The part-of-speech pointer 33 indicates an address of the part-of-speech storage area 40, where the part-of-speech corresponding to the searched word data 31, is stored.

The end code 34 indicates the end of the data, and is provided at the end of the storage areas 30, 40, 50 and 60, and buffers 15d and 15e. Thus, in the word data storage area 30, the end code 34 indicates the end of all of the word data 31, and therefore, the end of the word data storage area 30. Each word data 31 has an unfixed length of data, a one-byte terminator code 32, and a two-byte part-of-speech pointer 33.

Figure 4:
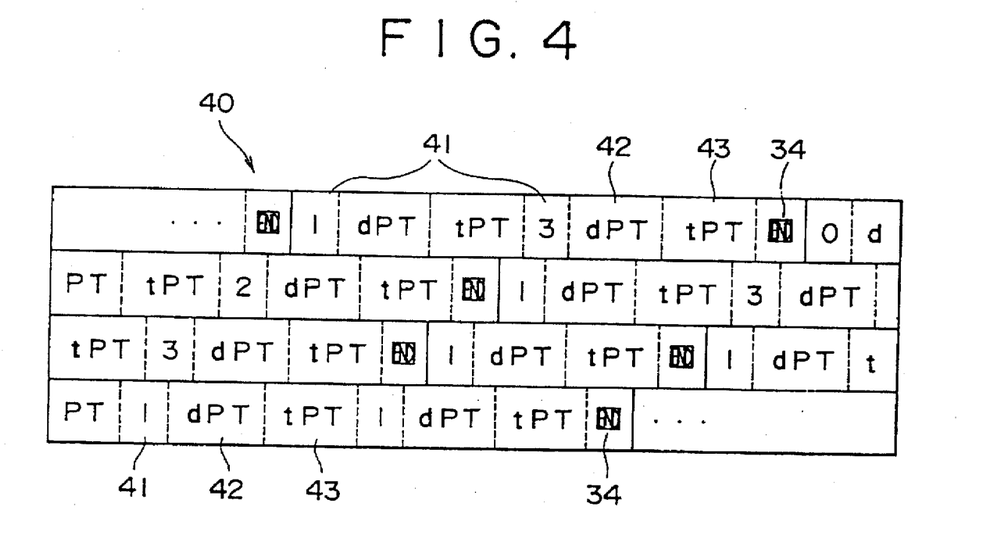
FIG. 4 shows a map of a part-of-speech storage area of the dictionary memory shown in FIG. 2.

FIG. 4 shows a map of the part-of-speech storage area 40. In the part-of-speech storage area 40, groups of part-of-speech data including a part-of-speech code 41, a definition pointer (dPT) 42, a thesaurus pointer (tPT) 43, and an end code 34 are stored for each word. The part-of-speech pointer 33 stored in the word data storage area 30 indicates the address of the part-of-speech code 41, which is the first data of each group of part-of-speech data.

The part-of-speech code 41 is one byte of data indicating the part-of-speech of the definition of the word. In the embodiment, "1" corresponds to a noun, "2" corresponds to an adverb, and "3" corresponds to a verb.

The definition pointer (dPT) 42 indicates an address of the definition storage area 50 where the definition data is stored. The definition pointer 42 is two bytes, and is inserted immediately after the part-of-speech code 41.

The thesaurus pointer 43 indicates the address of the thesaurus storage area 60 where the thesaurus data 61 is stored. The thesaurus pointer 43 is also two bytes, and is located immediately after the definition pointer 42.

The end code 34 in the part-of-speech storage area 40 indicates the end of data corresponding to a word. A group consisting of one part-of-speech code 41, one definition pointer 42, and one thesaurus pointer 43 is provided for each definition of a word. The number of definitions for each word can vary, depending on the word.

For example, if a word has two noun definitions and three verb definitions, then five groups of the part-of-speech code 41, the definition pointer 42, and the thesaurus pointer 43, are provided. The end code is inserted because the length of data corresponding to each word data is not constant.

Figure 5:
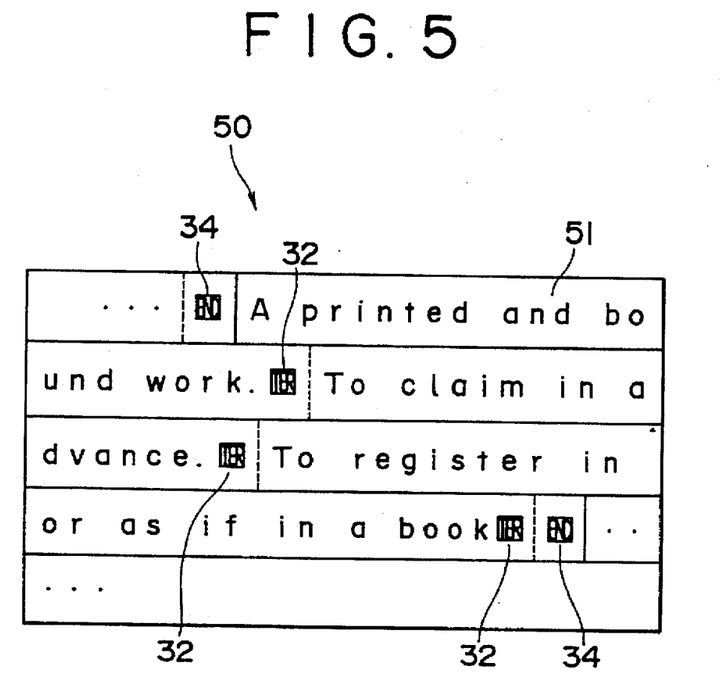
FIG. 5 shows a map of a definition storage area of the dictionary memory shown in FIG. 2.

FIG. 5 shows a map of the definition storage area 50 of the dictionary memory 13a. The definition data 51, the terminator codes 32, and the end codes 34 are stored in the definition storage area 50. The start address of definition data 51 stored in the definition storage area 50 is stored in the definition pointer 42, which is stored in the part-of-speech storage area The definition data 51 gives the definition corresponding to the searched word. The length of the definition data 51 is not fixed, and therefore, the terminator code 32 is used to separate sequential definition data 51, stored in the definition storage area 50.

The end code 34 in the definition storage area 50 indicates the end of all the definition data 51 for a word. As described above, each word may have a plurality of definitions, with each definition separated from a sequential definition by the terminator code 32, and the end of all the definitions for the selected word being indicated by the end code 34.

Figure 6:
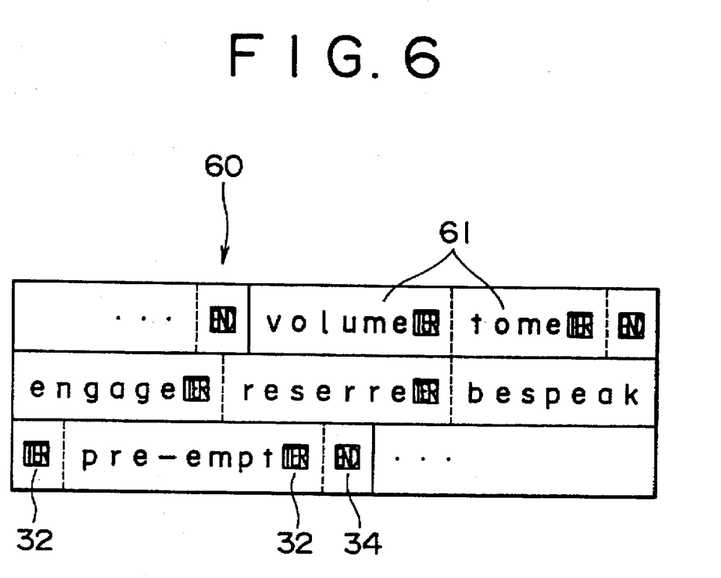
FIG. 6 shows a map of thesaurus storage area of the dictionary memory shown in FIG. 2.

FIG. 6 shows a map of the thesaurus storage area 60 of the dictionary memory 13a. The thesaurus data 61, the terminator code 32 and the end code 34 are stored in the thesaurus storage area 60. The start address of the thesaurus data 61 is indicated by the thesaurus pointer 43 which is stored in the part-of-speech storage area 40. As described above, each word may have a plurality of synonyms, grouped according to the definition of the word, with the synonyms corresponding to each definition of the word being separated by the terminator code 32. The end code 34 in the thesaurus storage area 60 indicates the end of all the thesaurus data 61 corresponding to a definition of the selected word.

Figure 7:
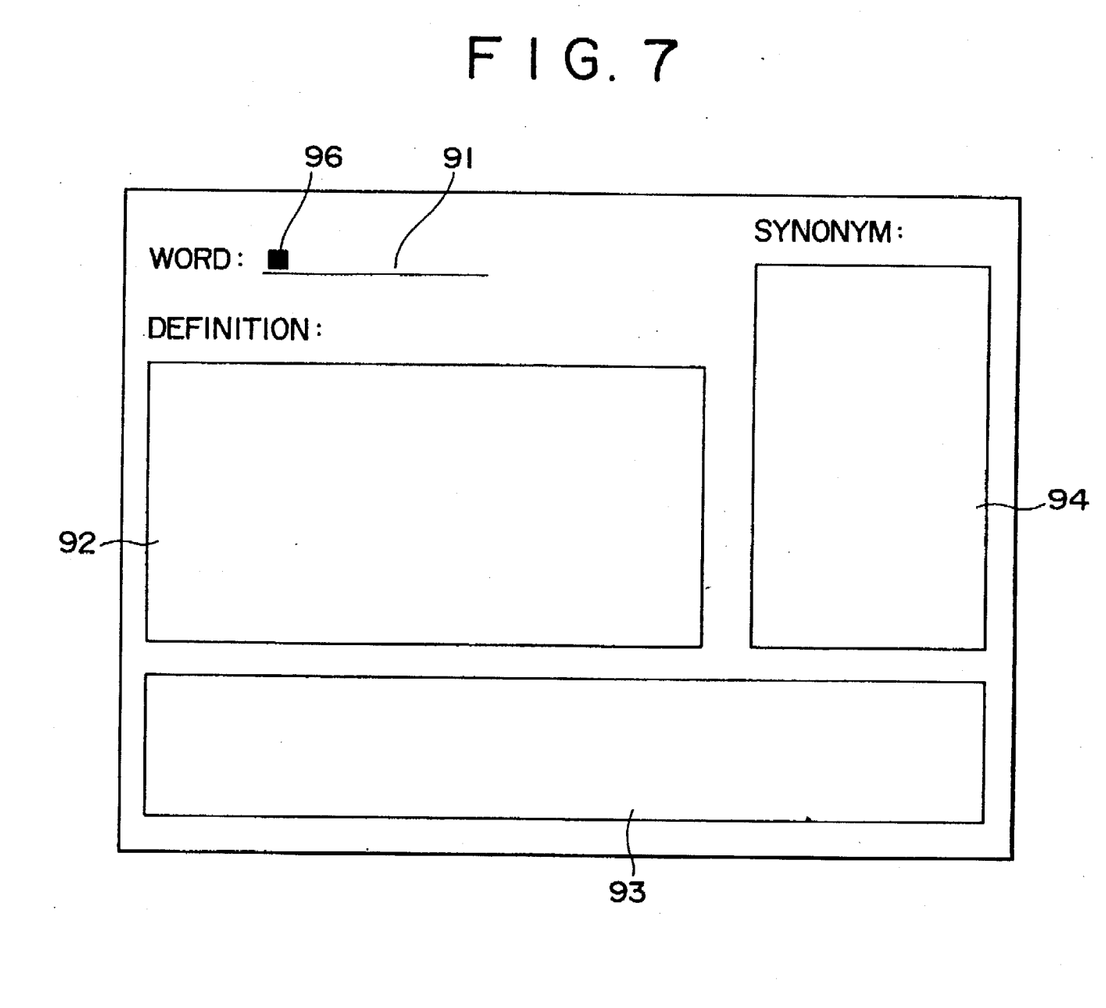
FIG. 7 shows an initial screen displayed on a display device of the electronic data search device shown in FIG. 1.

FIG. 7 shows an initial screen image of the word search operation. There are four areas: a word input area 91, a list area 92, a full text area 93, and a synonym area 94.

In the word input area 91, the word inputted by the user is displayed. As shown in FIG. 7, an input cursor 96, which indicates the position at which the data is inputted through the keyboard 2, is initially located at the word input area 91.

In the list area 92, parts-of-speech and definitions are displayed in a list. Each line of the list consists of one part-of-speech and one definition, of the searched word. If, for example, a word has three definitions, the list shows three lines of data, each line has a part-of-speech and one of the three definitions. If the length of the definition is too long, such that the definition cannot be displayed on one line, the overflow portion of the definition is not displayed. In the full text area 93, the full text of the part-of-speech, and the definition corresponding to a line in the list area 92, which is highlighted with a block cursor 95 (see FIG. 12), is displayed. As described above, some of the data in the list area 92 may be omitted if the length of the data exceeds the length of a line of the list area 92. However, by selecting the line in the list area 92 which has the desired definition and part-of speech, the full text of the line will be displayed in the full text area 93. Thus, it is unnecessary to scroll the displayed image in order to read all of the desired data.

In the synonym area 94, synonyms corresponding to the definition which is highlighted with the block cursor 95 in the list area 92, are displayed. In the synonym area 94, a plurality of lines of data can be displayed, with only one synonym being displayed on each line.

The operation of the electronic data search device 1 will be described below with reference to FIGS. 8 through 13.

Figure 8:
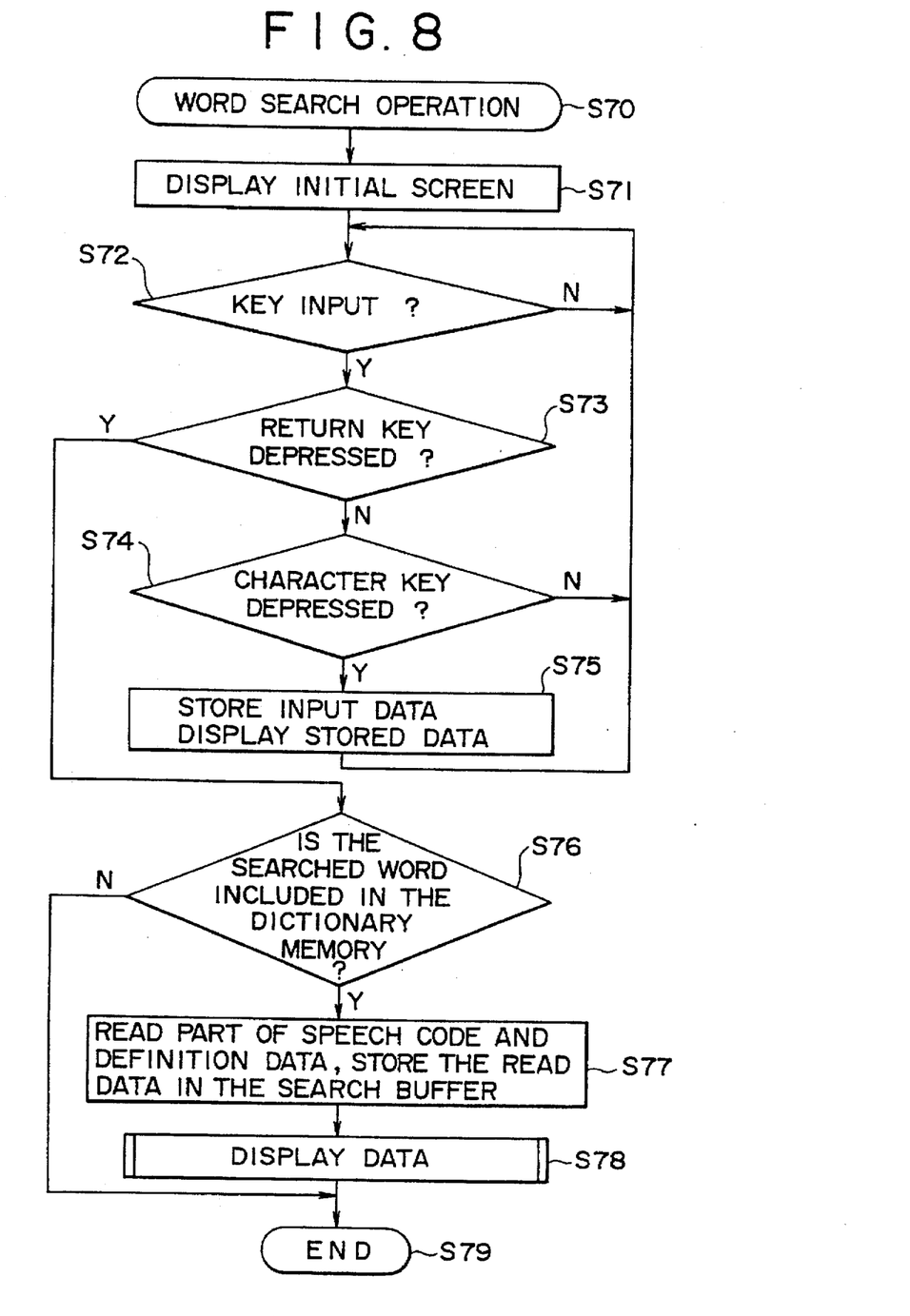
FIG. 8 is a flowchart illustrating a word search operation.

FIG. 8 is a flowchart illustrating a word search operation.

When a user depresses the search key on the keyboard 2, the operation in FIG. 7 starts, in step S70. The CPU 11 reads and executes the word search program 13c. In step S71, the initial screen image as shown in FIG. 7 is displayed on the CRT display 8. Control then waits at step S72 for data entry (S72:NO). If a key is depressed (S72:YES), flow of control goes to step S73 where it is determined whether the Return key has been depressed. If the Return key has not been depressed (S73:NO), it is determined whether a character key has been depressed in step S74. If a character key has been depressed (S74:YES), then data related to the character is stored in the input buffer 15c. The stored data is then displayed on the CRT display 8, and the input cursor 96 is shifted one column to the right. In steps S73 and S74, if the Return key or a character key is not depressed, the key operation is ignored (S74:NO), and control goes to S72. When the user has input all the characters, and the Return key has been depressed (S73:YES), control goes to step S76.

At S76 it is detected whether the input word, stored in the input buffer 15c, is stored in the dictionary memory 13a. The word search is performed by comparing the data stored in the input buffer 15c with the word data 31 stored in the word storage area 30 of the dictionary memory 13a.

Specifically, the word data between the start of the word storage area 30 and the terminator code 32 is read, and the word data and the data stored in the input buffer 15c are compared. If the data are the same, then S76 determines that the word search has been successful. If the data do not match, the subsequent word data 31 is read from the word storage area 30, and compared with the data stored in the input buffer 15c. This process is repeated until one of the word data 31 stored in the dictionary memory 13a matches the input data stored in the input buffer 15c.

The start address of the subsequent word data 31 is obtained by adding "3" to the address of the terminator code 32. This is because the terminator code 32 is one byte long, and the part-of-speech code, located after the terminator code, is two bytes long. If the start address of the subsequent word data 31 is the end code 34, it is determined that the input data is not stored in the dictionary memory 13a (S76:NO), and the word search operation is terminated in step S79. If the input word is found in the dictionary memory 13a (S76:YES), the part-of-speech pointer 33 stored immediately after the terminator code 31 of the searched word data 31 is read. The part-of-speech code 41, corresponding to the part of speech pointer 33, and the definition data 51, are read from the part-of-speech storage area 40 and the definition storage area 50, respectively. The read data is then stored in the search buffer 15d in step S77, and displayed on the display 2, in step S78. The operation is then ended at step S79.

The reading of the part-of-speech code and the definition data, described in step S77, will be described in detail below.

Initially, at the address indicated by the part-of-speech pointer 33, a one-byte data (i.e., the part-of-speech data 41) is read, and then stored at the start address of the search buffer 15d.

Next, a two-byte data (i.e., the definition pointer 42) stored immediately after the part-of-speech data 41 is read. The definition pointer 42 indicates the start address of the definition data 51 corresponding to the part-of-speech code 41. As described before, the definition data is stored between the address indicated by the definition pointer 42 and the terminator code 32 thereafter. This definition data, along with its terminator code 32, is read out and stored in the search buffer 15d after the part-of-speech code 41.

After the part-of-speech code 41 and the definition data 51 have been stored in the search buffer 15d, the subsequent part-of-speech code 41 is obtained. Since the subsequent part-of-speech code 41 is located after the definition pointer dPT and the thesaurus pointer tPT, each of which is two bytes long, the part-of-speech pointer 33 is incremented by "5".

If the read data is not the end code 34 (i.e., if the read data is a part-of-speech code 41), the searched word has another part-of-speech code 41 and another definition data 51. In this case, the data is read and stored in the search buffer 15d, after the previous set of data..

If the data at the address which is obtained by adding "5" to the part-of-speech pointer 33 is the end code 34, the searched word has no more part-of-speech codes 41 or definition data 51. In this case, the end code 34 is stored in the search buffer 34, and the operation at step S77 is completed.

Figure 9:
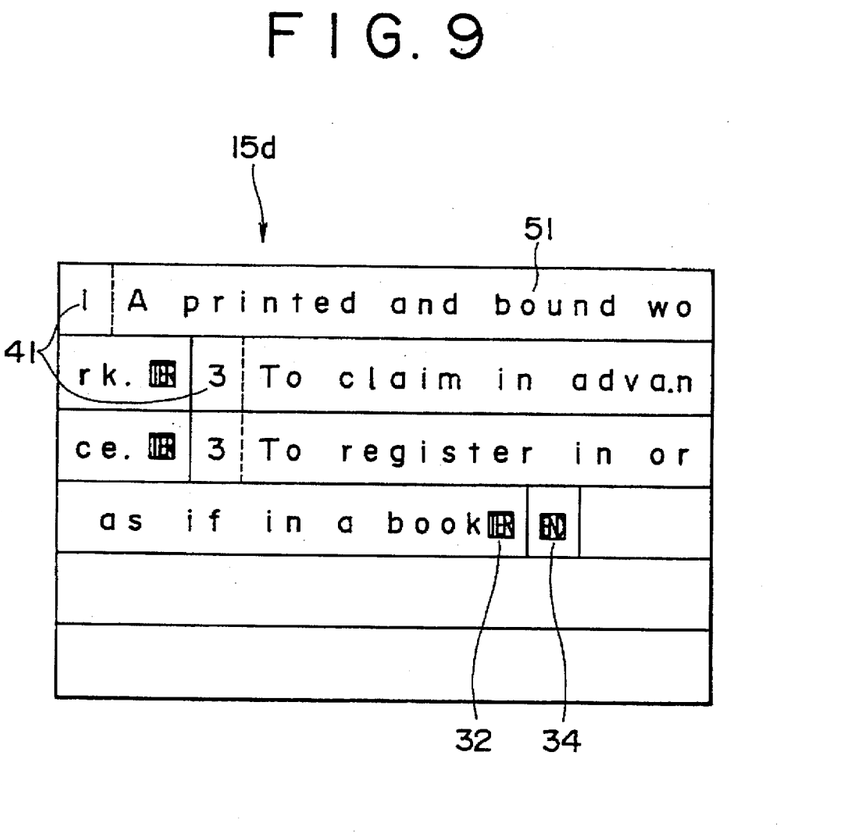
FIG. 9 shows a memory map of a search buffer used in the electronic data search device shown in FIG. 1.

FIG. 9 shows a map of the data buffer 15d in which the search result is stored, as described above.

In the above described embodiment, all the thesaurus data 61 corresponding to the searched word are not stored in the buffer 15e in step S77. Since the number of the synonyms corresponding to all the definitions of the searched word may be large, then a large size memory would be required to store all the synonyms in the buffer 15e. In the embodiment, only the thesaurus data 61 corresponding to the definition highlighted by the block cursor 95 in the list area 92 are stored in the thesaurus buffer 15e.

Figure 10A:
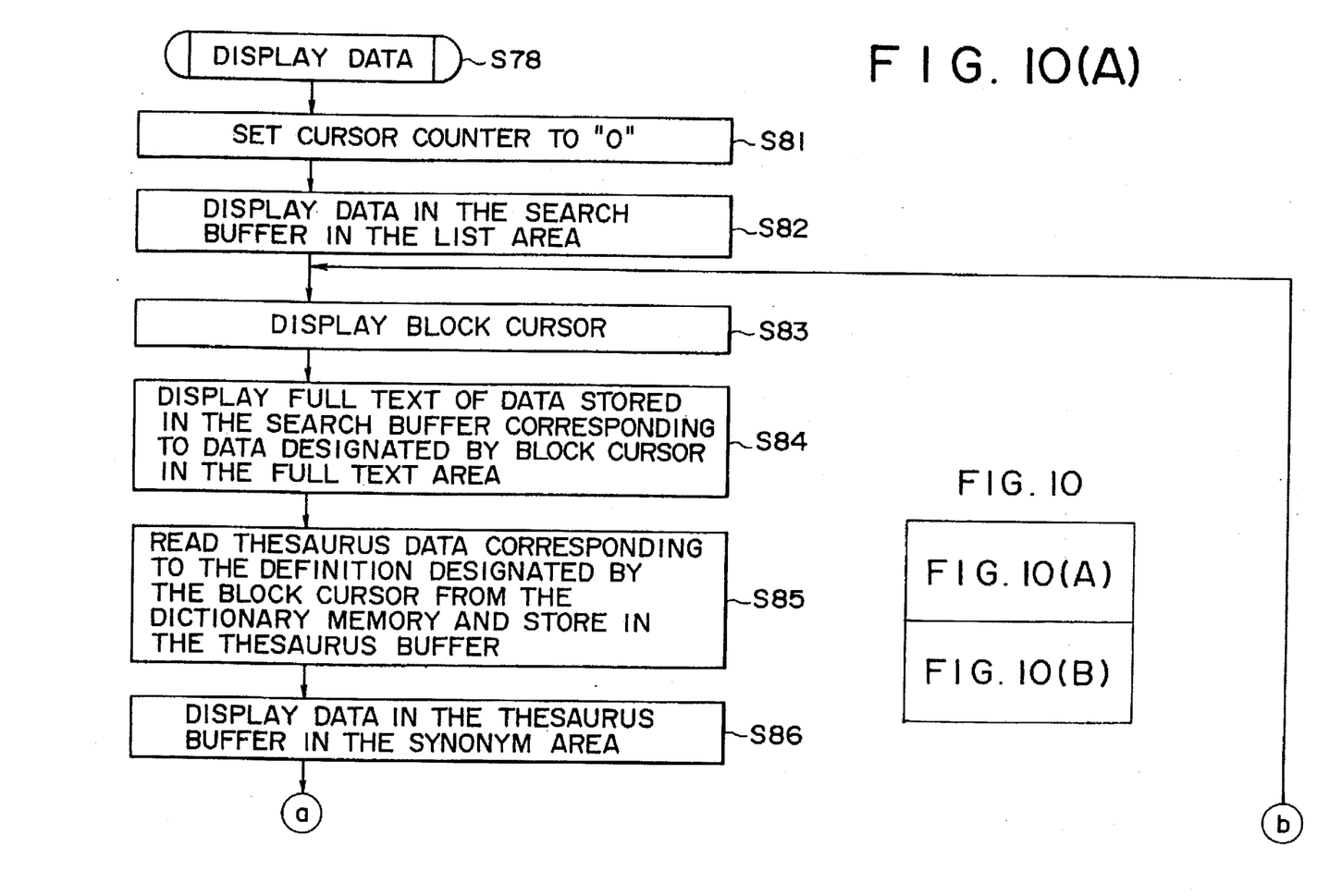
FIGS. 10A and 10B show a flowchart illustrating a data displaying operation.
Figure 10B:
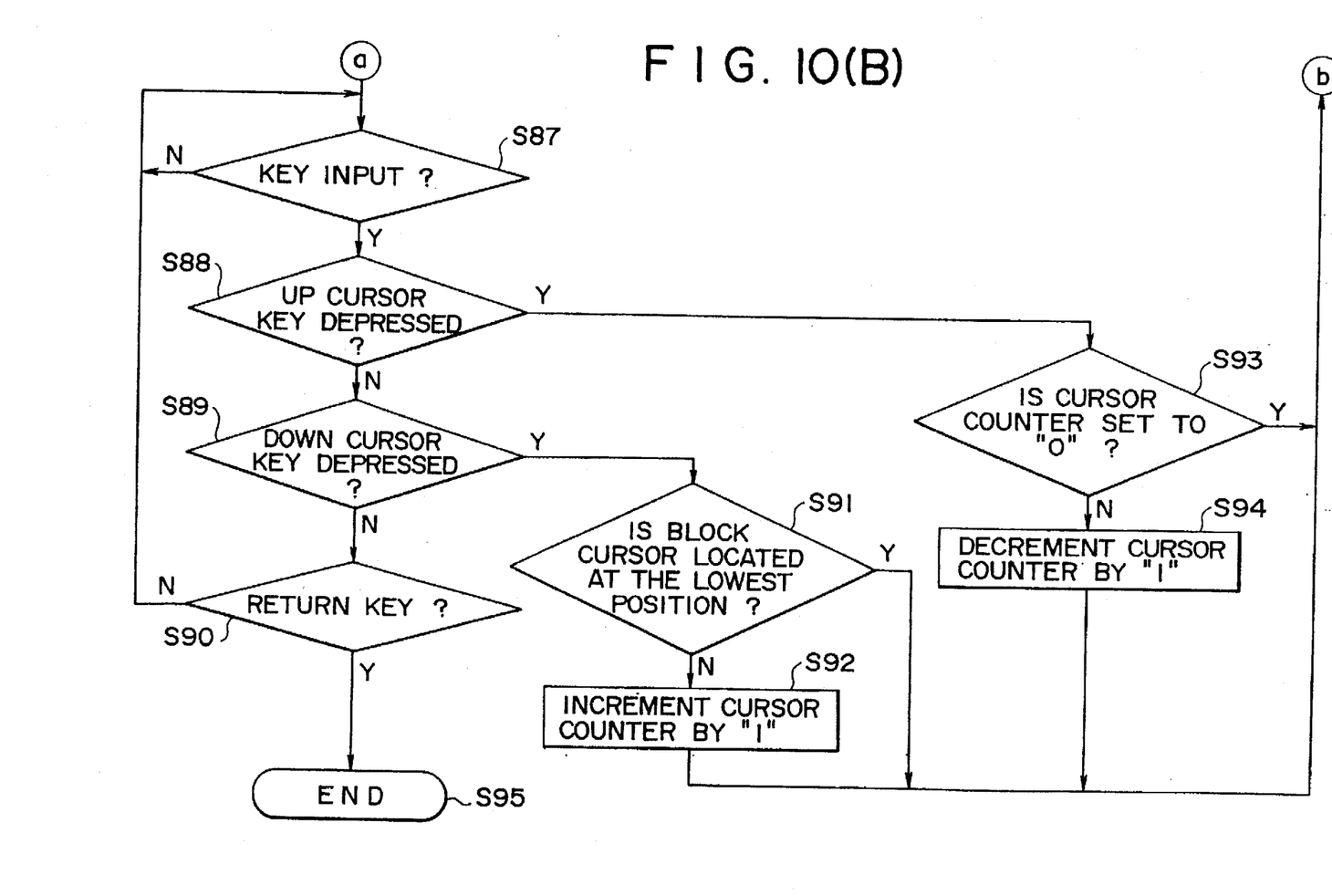

FIG. 10 is a flowchart illustrating the data displaying operation of step S78, in which the search result is displayed on the CRT display 8.

In step S81, the cursor counter 15b, which corresponds to the position of the block cursor, is cleared (set to "0"). In step S82, the data stored in the search buffer 15d is displayed in the list area 92 on the CRT display 8. The part-of-speech code 41 corresponding to the name of the part-of-speech, is displayed on the screen of the CRT display 8. For example, the codes "0", "1", "2", "3", corresponding to the names "adjective", "noun", "adverb", "verb", respectively, are displayed.

The definition data 51 is displayed after the displayed part-of-speech. As described before, one definition data is displayed only on one line of the list area 92. If there are three definitions, three lines of part-of-speech names and definitions are displayed in step S82. If the definition text overflows the line on which it is displayed the overflow portion is not displayed.

Figure 11:
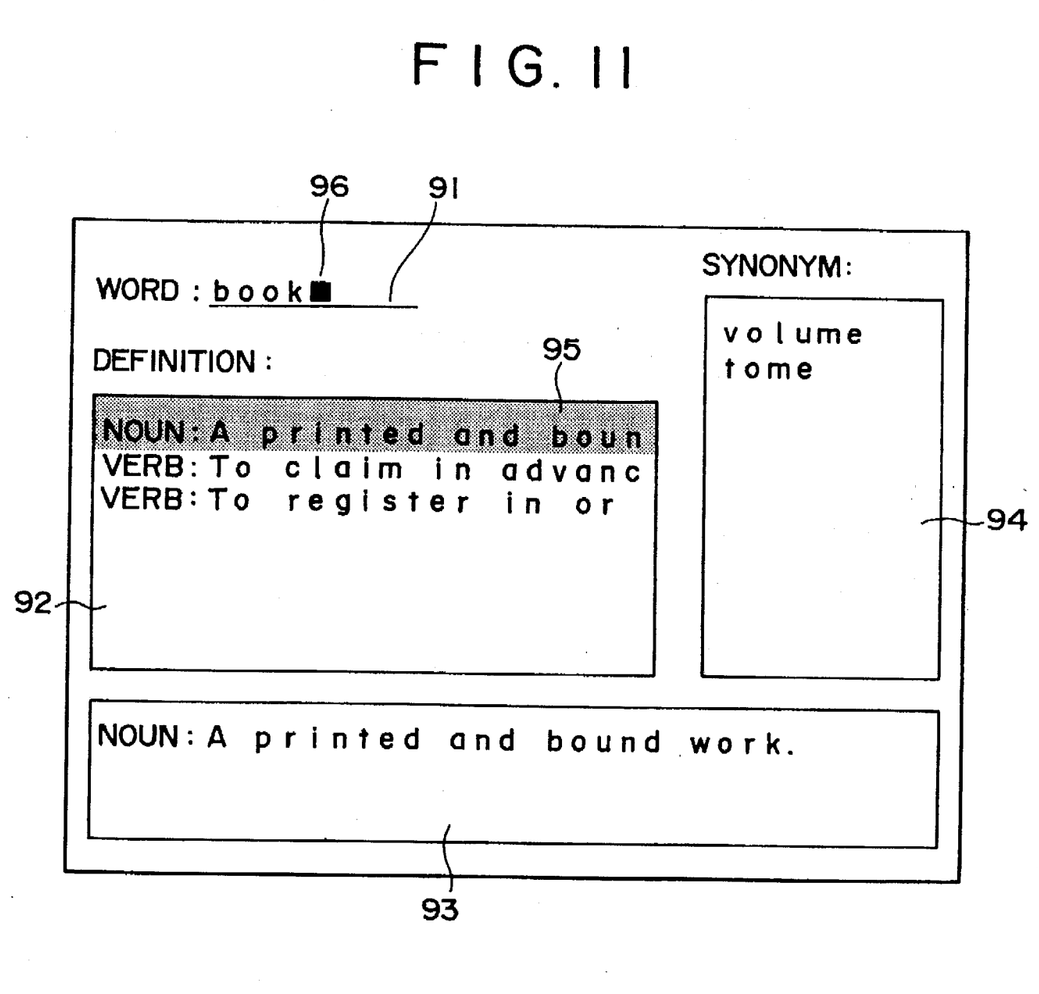
FIG. 11 shows an example of a screen image of the electronic data search device shown in FIG. 1.

In step S83, the block cursor 95 is displayed at the position indicated by the cursor counter 15b. If the cursor counter 15b is "0", the block cursor 95 is displayed on the first line in the list area 92, if the cursor counter 15b is "1", the block cursor 95 is displayed on the second line, etc. Since the cursor counter 15b is set to "0" in step S81, the block cursor is displayed on the first line in the list area 92, as shown in FIG. 11.

In step S84, all the text data corresponding to the data highlighted by the block cursor 95, and stored in the search buffer 15d, is displayed in the full text area 93. More specifically, a portion of the data stored in the search buffer 15d is read in accordance with the value of the cursor counter 15b. If the cursor counter 15b is "0", then the data is read from the start of the search buffer 15d; if the cursor counter 15b is "n", the data starting immediately after the n-th terminator code 32 is read. The first data read is the part-of-speech code, which is converted from a value, into a corresponding name such as "noun", "verb", etc., The part-of-speech name is located at the upper left corner of the full text area between data between the part-of-speech code 43 and the terminator code 32 is the definition data 51. The definition data 51 is read and then displayed in the full text area after the part-of-speech name.

An example of the operation in step S84 when the data is stored in the search buffer 15d as shown in FIG. 9, and the cursor counter 15b is set to "1", will be described below.

The CPU 11 searches for the first terminator code 32 after the start of the search buffer 15d, and reads the part-of-speech code 41, immediately following the terminator code 32. As shown in FIG. 9, the part-of-speech code 41 is "3", which corresponds to "verb". Accordingly, the character string "verb" is displayed in the full text area 93 of the CRT display 8. Then, the definition data 51 stored immediately after the part-of-speech code 41, is displayed after the displayed part-of-speech name, in the full text area 93, as shown in FIG. 11.

The CPU 11 then reads the thesaurus data 51 corresponding to the data indicated by the cursor counter 15b from the dictionary memory 13a, and stores the data in the thesaurus buffer 15e (S85). Specifically, the CPU 11 searches the word in the word storage area 30 again, and reads the part-of-speech pointer 33, which points to the first part-of-speech code 41 for the searched word. Each group of data has 5 bytes as described earlier, with the thesaurus pointer 43 being located after the third byte. Therefore, the CPU 11 obtains an address of the thesaurus pointer 43 by multiplying the value of the cursor counter 15b by "5", adding "3" to the product, and adding the result to the address of the first part-of-speech code 41. The thesaurus pointer 43 then gives the address of the thesaurus data 61 in the thesaurus storage area 60 of the dictionary memory 13a.

Figure 12:
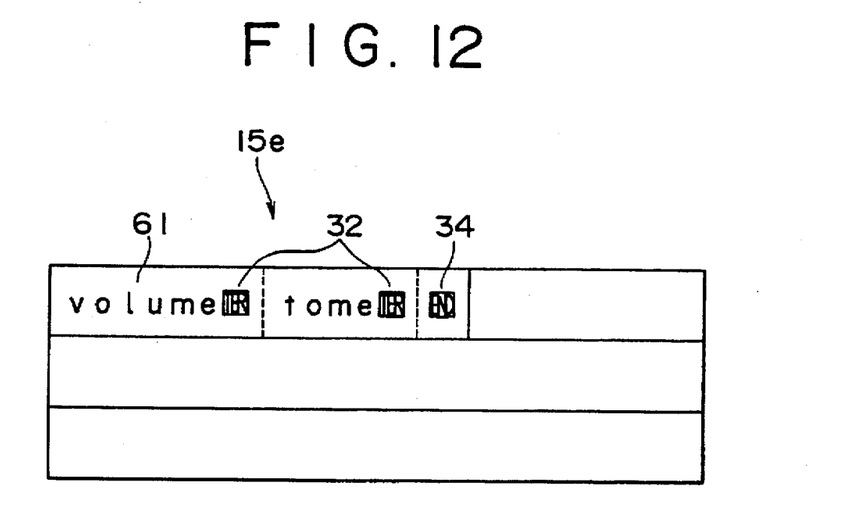
FIG. 12 shows a map of a thesaurus buffer used in the electronic data search device shown in FIG. 1.

The data stored between the address indicated by the thesaurus pointer 43 and the end code 34 is stored in the thesaurus buffer 15e. The data stored in the thesaurus buffer 15e represents synonyms corresponding to the definition highlighted by the block cursor 95. FIG. 12 shows a map of the thesaurus buffer 15e in which the thesaurus data 61 is stored.

Figure 13:
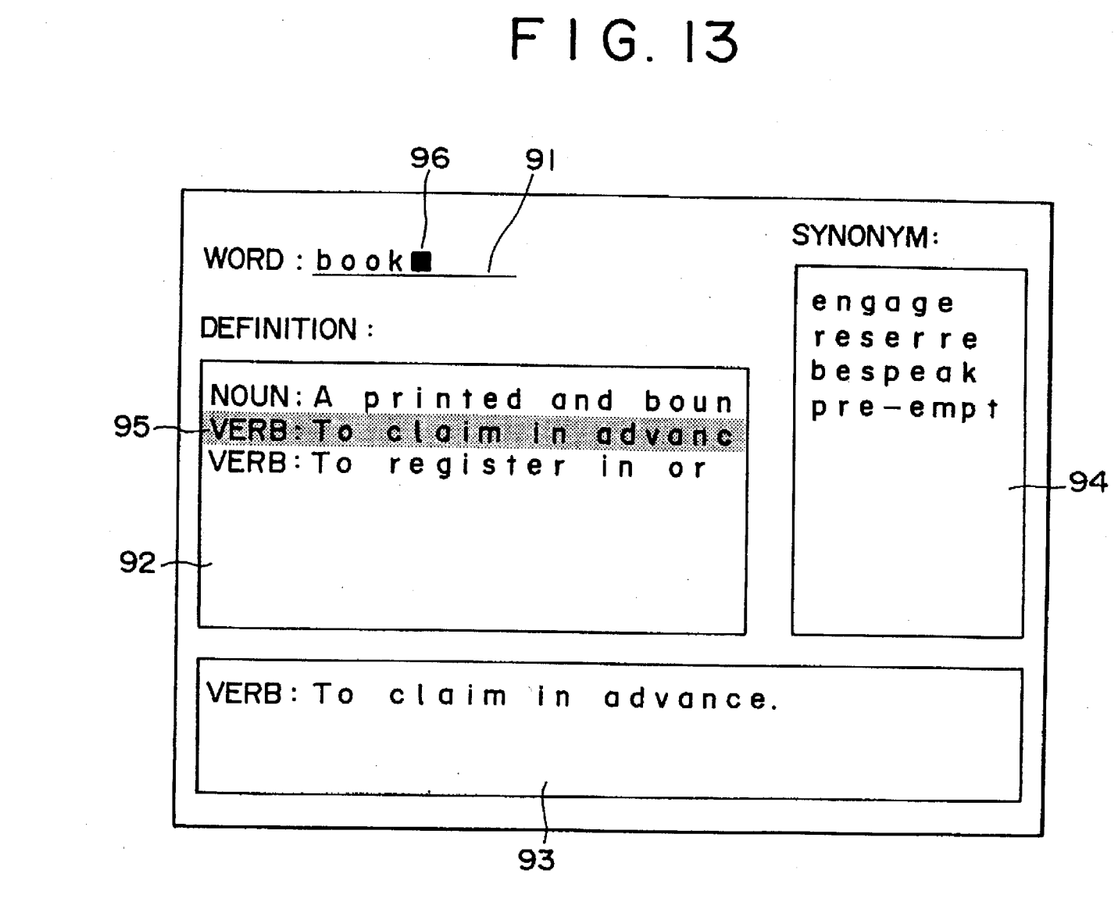
FIG. 13 is the same screen image as shown in FIG. 11 except that a cursor is moved to the following line.

As shown in FIGS. 11 and 13, the thesaurus data 61 stored in the thesaurus buffer 15e is displayed in the synonym area 94 on the CRT display 8 in step S86. As shown in the drawings, one synonym is displayed on each line.

When all the data has been displayed in the list area 92, the full text area 93, and the synonym area 94, the CPU 11 waits for the depression of one of the up cursor key, down cursor key, or the Return key in steps S87 through S90. If the up or down cursor key is depressed (S88:YES or S89:YES), the cursor counter 15b is updated in steps S91 through S94, and the block cursor displayed in the list area 92 is moved. As the value in the cursor counter 15b and therefore the position of the block cursor 95 changes, the display in the full text area 93 and in the synonym area 94 is updated. If the Return key is depressed (S90), the data display operation and the word search operation are completed in step S95.

If the cursor counter 15b is "0" and the up cursor key is depressed (S93:YES), the key input is ignored, and the block cursor 95 stays at the first line of the list area 92. If the cursor counter 15b is set to its maximum value and the down cursor key is depressed (S91:YES), the key input is ignored, and the block cursor 95 stays at the lowest line of the list area 92.

The screen image when the searching and data displaying operations are executed will be described below with reference to FIGS. 11 and 13. In these figures, the screen image of the searched word "book", is shown.

In FIG. 11, the block cursor 95 is displayed on the first line of the list area 92. Three definitions are displayed in the list area. Each definition is displayed on one line together with its part-of-speech. The part-of-speech and all text of the definition corresponding to the definition highlighted by the block cursor 95, is displayed in the full text area 93. Synonyms corresponding to the definition highlighted by the block cursor 95, are displayed in the synonym area 94.

FIG. 13 shows the screen image when the block cursor 95 is moved down by one line. Since the block cursor 95 is located on the second line in the list area 92, the data displayed in the full text area 93 is updated accordingly. Synonyms corresponding to the new definition highlighted by the block cursor 95 are displayed in the synonym area 94.

According to the above description, a list of definitions, and all of the text of one of the definitions selected by the block cursor is displayed on one screen, allowing the user to easily refer to the desired data without scrolling the displayed image.

In the list of definitions area, at least a part of the text of each definition is displayed, which enables the user to have some idea about all of the meaning of the searched word. Further, with this construction, the user can easily identify which definition should be displayed in the full text area.

Further, according to the invention, the user can refer to synonyms corresponding to the selected definition of the searched word.

An electronic dictionary is illustrated as an embodiment of the invention. However, the invention is applicable to any type of device which searches and displays data.

What is claimed is:

1. A data searching device comprising:

input means for inputting data;

a memory for storing primary data and a plurality of secondary data related to said primary data;

a display for displaying inputted data;

a selector for selecting inputted data displayed on said display; and a controller for comparing said input data with said primary data, said controller outputting secondary data related to primary data compared to said input data to said display, wherein said display has a plurality of display areas, wherein a first display area displays a portion of each of said secondary data related to said primary data, said selector selecting one of said secondary data displayed in said first display area, wherein a second display area displays all of one of said secondary data selected by said selector.

2. A data searching device according to claim 1, wherein said primary data compared to said input data is displayed in a third display area of said display, and wherein said first display area, said second display area and said third display area are displayed simultaneously on said display.

3. The data searching device according to claim 2, wherein said primary data comprises a word to be searched for, and wherein each of said secondary data related to said primary data comprises:

a part-of-speech code for said word; and a definition of said word.

4. The data searching device according to claim 3, wherein each of said secondary data further comprises synonyms of said word corresponding to said definition of said word.

5. The data searching device according to claim 3, wherein a part-of-speech name corresponding to said part-of-speech code, and said definition, are displayed in said first display area, for all of said secondary data related to said primary data, wherein each of said secondary data is displayed on only one line of said first display area.

6. The data searching device according to claim 5, wherein a cursor is displayed in said first display area, said cursor being moved between each of said secondary data displayed in said first display area by said selector, wherein when said cursor highlights one of said secondary data displayed in said first display area, all of said one of said secondary data is displayed in said second display area.

7. A data searching device comprising:

a data inputting keyboard;

a primary data memory;

a secondary data memory;

a display;

a secondary data selector; and a controller, wherein said controller compares data inputted by said data inputting keyboard with primary data stored in said primary data memory, wherein said controller outputs to said display, said secondary data stored in said secondary data memory related to primary data which matches said inputted data, and wherein said display has a plurality of display areas, wherein a first display area displays a portion of each of said secondary data related to said matching primary data, said selector selecting one of said secondary data displayed in said first display area, wherein a second display area displays all of one of said secondary data selected by said selector.

8. A data searching device according to claim 7, wherein said matching primary data is displayed in a third display area of said display, and wherein said first display area, said second display area and said third display area are displayed simultaneously on said display.

9. The data searching device according to claim 8, wherein said primary data comprises a word to be searched for, and wherein each of said secondary data related to said primary data comprises:

a part-of-speech code for said word; and a definition of said word.

10. The data searching device according to claim 9, wherein each of said secondary data further comprises synonyms of said word corresponding to said definition of said word.

11. The data searching device according to claim 9, wherein a part-of-speech name corresponding to said part-of-speech code, and said definition, are displayed in said first display area, for all of said secondary data related to said primary data, wherein each of said secondary data is displayed on only one line of said first display area.

12. The data searching device according to claim 11, wherein a cursor is displayed in said first display area, said cursor being moved between each of said secondary data displayed in said first display area by said selector, wherein when said cursor highlights one of said secondary data displayed in said first display area, all of said one of said secondary data is displayed in said second display area.

13. A method of displaying data on a screen of a data searching device, said method comprising the steps of:

inputting data;

storing primary data and a plurality of secondary data related to said primary data;

comparing said input data with said primary data;

displaying a portion of all of said secondary data in a first display area of said screen;

selecting one of said secondary data displayed in said first display area; and displaying all of said selected secondary data in a second display area of said screen.

14. The method of displaying data on a screen of a data searching device, according to claim 13, which further comprises the step of displaying said primary data in a third display area of said screen, wherein said primary data and said secondary data are displayed simultaneously.

15. The method of displaying data on a screen of a data searching device, according to claim 14, wherein said primary data comprises a word to be searched for, and wherein each of said secondary data related to said primary data comprises:

a part-of-speech code for said word; and a definition of said word.

16. The method of displaying data on a screen of a data searching device, according to claim 15, wherein each of said secondary data further comprises synonyms of said word corresponding to said definition of said word.

17. The method of displaying data on a screen of a data searching device, according to claim 15, wherein a part-of-speech name corresponding to said part-of-speech code, and said definition, are displayed in said first display area, for all of said secondary data related to said primary data, wherein each of said secondary data is displayed on only one line of said first display area.

18. The method of displaying data on a screen of a data searching device, according to claim 17, which further comprises the steps of:

displaying a cursor in said first display area to highlight one of said secondary data, wherein when said cursor highlights said one of said secondary data displayed in said first display area, all of said one of said secondary data is displayed in said second display area.

* * * * *